A. W. CUNNINGHAM.
Churn.
No. 27,276.
Patented Feb. 28, 1860.
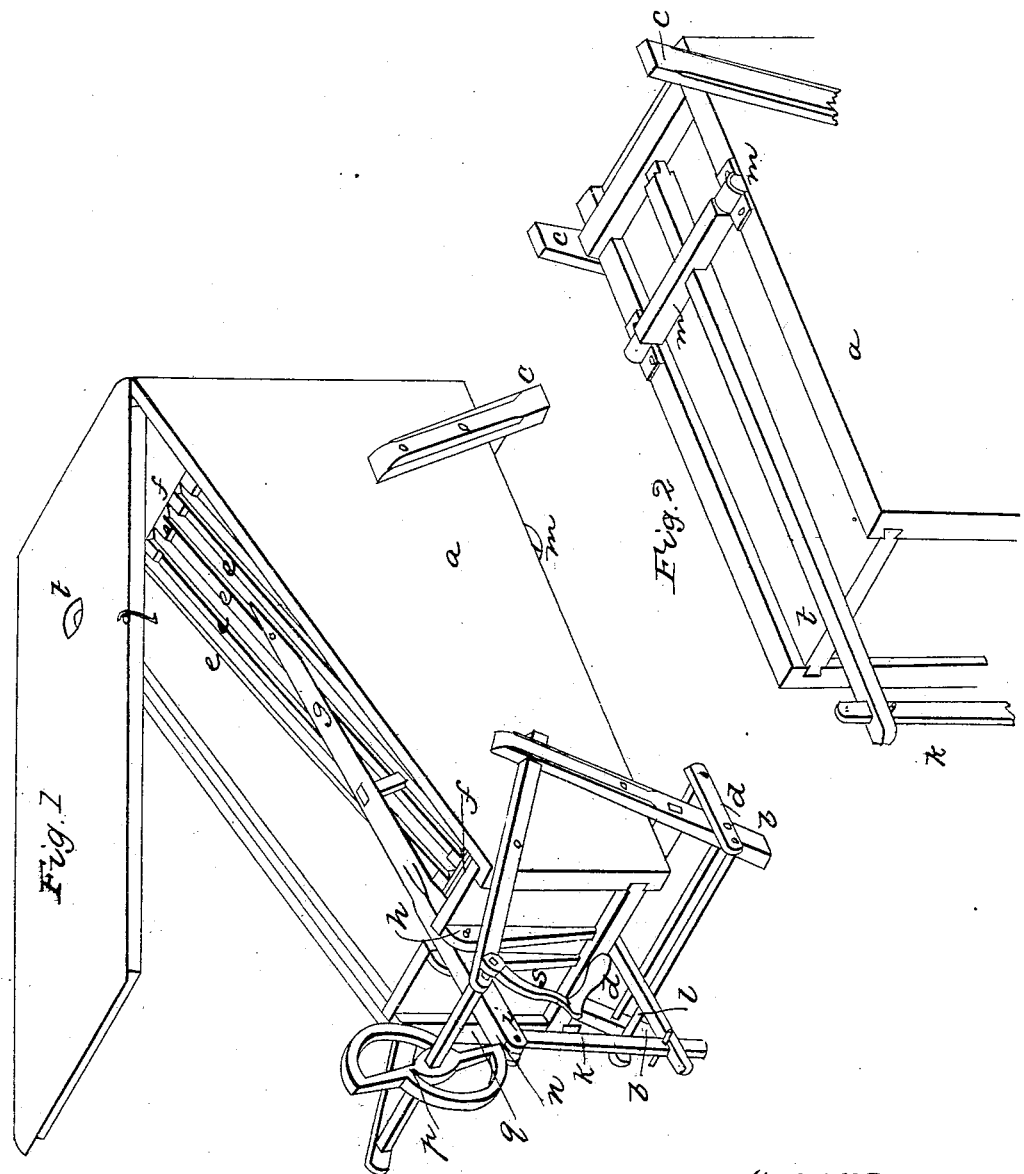
WITNESSES
Martin G. Cushing
Thos. J. Keenan
INVENTOR
W. A. Cunningham
by his attorney
W. Bakewell

UNITED STATES PATENT OFFICE.

A. W. CUNNINGHAM, OF WEST MIDDLETON, PENNSYLVANIA.

CHURN.

Specification of Letters Patent No. 27,276, dated February 28, 1860.

*To all whom it may concern:*

Be it known that I, ALEXANDER W. CUNNINGHAM, of West Middleton, in the county of Washington and State of Pennsylvania, have invented a new and useful Improvement in Churns; and I do hereby declare the following to be a full, clear, and exact description thereof, reference being had to the annexed drawing, forming part of this specification, in which—

Figure 1 is a perspective view of my improved churn, with the lid or cover raised to show the dasher. Fig. 2 is a view of the underside of the churn to show the mode of attaching the spring pole.

In both figures like letters of reference are used to denote similar parts.

In order to enable others skilled in the art to construct and use my improved churn, I will proceed to describe its construction and operation.

In the drawing $a$ represents the body of the churn, which consists of a box, having parallel sides and ends, but deeper at one end, than at the other, so that the top and bottom converge. This box is set upon four feet $b\ b\ c\ c$ in such manner that the sides and ends of the box are perpendicular, while the bottom is not horizontal, but inclines considerably toward the ground, at the rear end. The front feet $b, b,$ have a small frame $d$ hinged to them, by means of which the front feet may be lengthened, if desired, so as to elevate the front or small end of the churn, and thus increase the angle of inclination of the bottom of the churn. The dasher of the churn is a rectangular frame, composed of a number of strips $e, e,$ &c, parallel to each other, and united by a cross piece $f$ at each end. This dasher frame is nearly as long as the inside of the box $a$, and wide enough to work in the box without rubbing against the sides. The strips of which the dasher is made, are four-sided, and are so placed as to present a sharp edge or angle to the cream, as the dasher strikes it, that is, the sides of the strips are none of them parallel to the sides of the box $a$, but are at an angle of 45 degrees to the sides which they face. These strips are placed far enough apart to allow the cream to pass between them when the dasher makes its stroke. This dasher is so fastened to a lever $g$, that when the long arm of the lever (which is inside the box) is pressed down the dasher rests on the bottom of the churn. The lever $g$ is pivoted at $h$ to the front or small end of the churn, the extremities of its short arm being pivoted at $i$ to a pitman $k$ which is pivoted at its lower extremity to the free end of the spring pole $l$. The spring pole $l$ (see Fig. 2) which may be made of hickory or other suitable wood, extends under the bottom of the churn, is fastened at its rear end to the frame of the box $a$, and is confined by the cross piece $m$ near the rear end of the box. Thus when the lever $g$ is depressed at $n$ (the extremity of the short arm) the pitman $k$ depresses the free end of the spring pole $l$, and when the pressure at $n$ is removed the spring reacts and forcibly raises the short arm of the lever, thus giving a downward stroke to the dasher attached to its long arm.

At the extremity of the short arm of the lever $g$ which projects from the box, $a$, is a roller $n$, against which the cam $p$ presses to operate the churn. The cam $p$ is fastened to a horizontal shaft $q$, which is supported by two arms attached to the sides of the box $a$. The shaft $q$ is caused to revolve by means of the crank $s$. The cam $p$ consists of two semi-circular arcs, one extremity of each arc being placed at the center of the other semi-circular arc, the arcs being united by their chords and the shaft passing through the chords at a point midway between the inner extremities of the two arcs. The circumference of these semi-circular arcs comes in contact, as the shaft $q$ revolves, with the roller $n$, and as each arc passes over the roller $n$ it depresses the short arm of the lever $g$, raising the dasher to the position shown in Fig. 1, until the outer extremity of the arc passes the roller, when the dasher is free to fall, which it does with all the force of the spring pole $l$. The two arcs cause two strokes of the dasher to each revolution of the shaft $q$. The box of the churn is fitted with a cover having a small hole $t$ to admit the air.

Having thus described the construction of my churn, a few words will suffice to explain its operation. The churn box $a$ must not be filled so full as to cover the dasher with cream when it is raised, in order that the dasher may be raised out of the cream at each stroke. On turning the shaft, the dasher is raised up gradually, and falls suddenly with the full force of the spring pole. The shape of the strips of the dasher is such as to drive the cream upward with great force in thin sheets of fluid, between the strips, and against the sides and top of the churn, causing the rapid formation of globules of butter, and as the force of the stroke is greater at the extremity of the dasher than near the front end of the churn this is compensated for by the increased depth of cream in the churn at the rear end, caused by the inclination of the bottom of the box. When it is desired to gather the butter, it will be found desirable to let down the frame $u$ attached to the front legs of the churn box, so as to raise the front end and throw all the contents of the churn toward the lower end.

What I claim as my invention, and desire to secure by Letters Patent, is—

The combination of the spring dasher worked by a cam and constructed as described of longitudinal strips so set as to present their angular edge to the cream as they strike it, with a box deeper at one end than at the other to accommodate the stroke of the dasher.

In testimony whereof I, the said ALEXANDER W. CUNNINGHAM, have hereunto set my hand.

A. W. CUNNINGHAM.

Witnesses:
MARTIN G. CURLEING,
C. W. LEWIS.